United States Patent [19]

Greco et al.

[11] Patent Number: 4,757,116

[45] Date of Patent: Jul. 12, 1988

[54] ELASTOMERIC FLUID COMPOSITIONS, CROSSLINKING IN THE PRESENCE OF AMBIENT HUMIDITY, SUITABLE FOR USE IN SEALANTS

[75] Inventors: Alberto Greco, Dresano; Gabriele Lugli, San Donato Milanese, both of Italy

[73] Assignee: Enichem Sintesi S.p.A., Palermo, Italy

[21] Appl. No.: 53,350

[22] Filed: May 22, 1987

[30] Foreign Application Priority Data

May 29, 1986 [IT] Italy ................................ 20607 A/86

[51] Int. Cl.[4] ..................... C08F 40/00; C08F 283/02; C08G 73/00
[52] U.S. Cl. ................................... 525/452; 525/462; 525/464; 525/467; 528/369
[58] Field of Search ................ 528/369; 525/452, 462, 525/464, 467

[56] References Cited

U.S. PATENT DOCUMENTS

| | | | |
|---|---|---|---|
| 3,715,338 | 2/1973 | Schmelzer et al. | 528/369 |
| 4,322,327 | 3/1982 | Yoshimura et al. | 525/452 |
| 4,549,010 | 10/1985 | Sparer et al. | 528/369 |

Primary Examiner—Harold D. Anderson
Assistant Examiner—Dennis R. Daley
Attorney, Agent, or Firm—Hedman, Gibson, Costigan & Hoare

[57] ABSTRACT

Fluid compositions capable of crosslinking in ambient humidity to form elastomeric products are disclosed, comprising:
(A) an elastomeric aliphatic polycarbonate;
(B) an organic compound containing at least two N=C< groups, selected from bisketimines, bisketiminoenamines and bisketiminosilazanes;
(C) a tertiary amine with stress nitrogen bonded to a ketiminic carbon atom, preferably a bicyclic ketimine.

9 Claims, No Drawings

ELASTOMERIC FLUID COMPOSITIONS, CROSSLINKING IN THE PRESENCE OF AMBIENT HUMIDITY, SUITABLE FOR USE IN SEALANTS

The present invention relates to fluid compositions, capable of crosslinking in the presence of ambient humidity to form solid elastomeric products, to the process for preparing them, and to their use in the field of sealants.

Elastomeric bases, having terminal reactive groups are known in the art which are fluid under the ambient conditions and are capable of crosslinking under the effect of the atmospheric humidity, to yield solid and rubber-like products. The elastomeric products have many desirable characteristics, and are especially useful in the field of sealants.

Such elastomeric fluid bases, capable crosslinking under the ambient conditions useful in the field of sealants are disclosed in U.S. Pat. Nos. 3,7153,338 and 3,621,000. These elastomeric bases are fluid polymers containing arylcarbamate end groups or blocked isocyanate end groups, and are used as mixtures with such potential crosslinking agents as ketimines, hexamines and ketiminoenamines.

The above-cited elastomeric bases may be compounded to make sealant compositions, which also include one or more of the following additives: extender pigments (such as calcium carbonate), reinforcing fillers (such as pyrogenic silica), covering pigments (such as titanium dioxide), thixotropic agents, stabilizing agents (such as antioxidants and U.V. absorbers) and small amounts of a catalyst suitable to accelerate the crosslinking. The ability of the elastomeric fluid compositions to undergo crosslinking reactions in the presence of reactive groups released by atmospheric humidity makes sealant compositions containing these compositions particularly useful in the automotive, construction and glass industries.

In the case of elestomeric bases terminated with arylcarbamic groups, or blocked isocyanate groups, the crosslinking agent is the diamine or triamine which is released from ketimines or ketiminoenamines under the action of humidity, and which displace the blocked group or blocking agent, with the consequent formation of substituted ureic groups.

Fluid compositions containing ketimines in addition to elastomeric bases with arylcarbamate or blocked isocyanate end groups do not show some of the disadvantages typical of the urethanic sealants crosslinkable in the presence of ambient humidity.

The main disadvantage of the urethanic sealants is the impossibility of using filters or pigments which are not perfectly compatible and anhydrous, in view of the strong reactivity of the isocyanate groups. Other disadvantages include the evolution of gas during the crosslinking step, poor pot stability, and the possibility of undesired polymerization, catalysed by a possible excess of amino groups which may be released from the isocyanate group by the effect of ambient humidity.

Fluid compositions containing elastomeric bases with arylcarbamate or blocked isocyanate functional end groups, while avoiding some of the disadvantages characteristic of urethanic compositions, have the disadvantage of a low crosslinking rate, especially in cases wherein aliphatic diisocyanates are used in the preparation of the elastomeric bases.

The latter bases are usually prepared by reacting a suitable polymer-diol with a diisocyanate, and then blocking the isocyanate end groups with a phenol or substituted phenol.

In practice, only the elastomeric bases prepared from aromatic diisocyanates in combination with the ketimines are able to crosslink at an acceptable rate in contact with the ambient humidity.

However, such compositions also show lower resistance to U.V. ageing and undesirably high viscosity. High viscosity is particularly pronounced in cases where a polycarbonate-diol or of a polyester-diol is used, since these reactants generally have rather high viscosity values themselves (e.g., 10–50 Pa.s at 25° C.), even at relatively low molecular weights (1,000–3,000). From the foregoing it would appear to be highly desirable to use aliphatic diisocyanates for producing elastomeric bases with arylcarbamate end groups, which have a viscosity within an acceptable range, i.e., from 100 to 700 Pa.s. However, it has been observed that such elastomeric bases, as well as those containing a polybutadiene or a polycaprolactone, show very low crosslinking rates, at ambient temperature and humidity in the presence of bisketimines with setting times longer than 30 days, making them clearly unacceptable for practical uses. It has been furthermore observed that the usual catalysts in urethane chemistry, such as, e.g., the tertiary amines and some organometallic compounds (in particular organo tin compounds) do not yield any practical benefits in accelerating the crosslinking.

SUMMARY OF THE INVENTION

An object of the present invention is overcoming the drawbacks of the aforementioned prior art.

More particularly, it is an object of the present invention to provide an elastomeric fluid composition showing a high crosslinking rate under ambient conditions of temperature and humidity.

Another object of the present invention is to provide a method for the preparation of such elastomeric fluid composition.

A further object of the present invention is to disclose the use of the elastomeric fluid compositions in sealants having a high resistance to ageing.

Still further objects of the invention will become clear from the following disclosure.

A fluid composition crosslinkable at a high rate under the ambient conditions of temperature and humidity of the present invention comprises:

(A) an elastomeric aliphatic polycarbonate, having functional phenylcarbamate or (substituted phenyl)carbamate end groups, and having a molecular weight of from 500 to 3,000;

(B) an organic compound containing at least two N=C< groups, selected from bisketimines, bisketiminoethanamines and bisketiminosilazanes;

(C) a tertiary amine with stressed nitrogen bonded to a ketiminic carbon atom, preferably a bicyclic ketimine, wherein the (B) component is present in an amount which supplies a maximum of 2 total ketimino and enamino groups per each arylcarbamate group in the (A) component, and the (C) component is present in an amount of at least 0.5 parts by weight per each 100 parts by weight of the (A) component.

DETAILED DESCRIPTION OF THE INVENTION

The A Component

The (A) component in the elastomeric fluid compositions of the present invention is an elastomeric aliphatic polycarbonate, bearing having functional phenylcarbamate or (substituted phenyl)carbamate end groups.

Said (A) component is obtained from a polyol, preferably a diol, of polycarbonate, which is preferably reacted with preferably aliphatic diisocyanate, e.g., isophoronediisocyanate, to obtain the corresponding polymer with isocyanate end groups, which are blocked by means of the reaction with phenol or with a substituted phenol, e.g., a p-alkyl-phenol, containing from 1 to 10 carbon atoms in its alkyl group.

The polycarbonate-diols, useful for the purposes of the present invention can be obtained by means of the reaction of glycols with phosgene, in the presence of hydrochloric acid acceptors, or, preferably, by the transesterification of glycols with alkyl, allyl or aryl carbonates, e.g., as disclosed in U.S. Pat. Nos. 2,843,567; 2,789,964; and 3,544,524.

Another method for obtaining the polycarbonate-diols is that which is based on the addition of carbon dioxide to glycols in the presence of Lewis acids, or in the presence of some combinations of aluminum and zinc compounds soluble in water, as described, e.g., by Inovoe et al. in Makromol. Chem. 130, 210 (1969) and by Barba et al. in Makromol. Chemie, Rapid Communications, 5, 665 (1984). A further method entails the opening of cyclic carbonates in the presence of basic catalysts, as disclosed in U.K. Pat. No. 872,473.

The polycarbonate-diols used in the process of the present invention are those of aliphatic type, and, in particular those of elastomeric type, with a low glass transition temperature, and with a melting point lower than room temperature (20°–25° C.).

More particularly, the preferred polycarbonates are the polymers including 1,6-hexanediol with one of the following glycols: 1,3-butanediol, 1,4-butanediol, 1,5-pentanediol; 1,10-decanediol; 1,12-dodecanediol; neopenyl glycol; 2,5-hexanediol; 4,8-bis-hydroxymethyltricyclo-(5,2,1,0$^{2.6}$)decane; 1,4-bis-hydroxymethylcyclohexane, wherein 1,6-hexanediol constitutes at least 50 mole percent of the glycols used.

Another type of preferred polycarbonate is the polyether-polycarbonate, obtained from triethyleneglycol with such glycols as 1,3-butanediol and 1,4-butanediol; diethyleneglycol and di-propyleneglycol, wherein the triethyleneglycol constitutes at least 50 mole percent of the glycols used.

The first preferred class of polycarbonate-diols shows a glass transition temperature of from −50° to −60° C., and the second, of from −35° to −45° C.

All of the polycarbonates belonging to these classes may show a number average molecular weight of from 500 to 3,000.

Within this range of molecular weights, the polycarbonate-diols show a viscosity which can be as high as 200,000 cps at room temperature, for the higher molecular weights. The preferred viscosities are, however, those within the range of from 5,000 to 100,000 cps, always measured at room temperature (25° C.).

The polyether-diols useful for the purposes of the present invention can be obtained by means of the anionic polymerization of epoxides in the presence of glycols or of polyvalent alcohols. Suitable catalysts for that purpose are tertiary amines and potassium hydroxide.

The polymerization can be carried out in such a way as to produce block-polymers, and this technique is particularly useful when introducing primary hydroxy groups is desired, by introducing ethylene oxide into the end reaction step. The most used epoxides for this purpose are propylene oxide, butylene oxide, cyclohexene oxide, allylglycidylether and styrene oxide. As an alternative, the epoxides can be polymerized with Lewis acids, such as boron trifluoride, perchloric acid and etherated boron trifluoride, aluminum-alkyls or zinc-alkyls in combination with water.

The aliphatic polycarbonate-diols are capable of producing an (A) component endowed with a higher resistance to oxidation, to hydrolysis, to U.V. light and to ageing in general, making this (A) component particularly suitable for the production of sealant compositions for outdoor applications.

According to the process of the present invention, the polymer diol is reacted with a diisocyanate, in particular with an aliphatic isocyanate, with the ratio of —NCO groups to —OH groups being kept within the range of from 2/1 to 5/1 and preferably of from 2/1 to 3/1. The reaction is generally carried out without catalysts, at temperatures generally not exceeding 75° C.

In case of polycarbonate-diols with higher viscosities it is preferred to carry out the reaction in the presence of small amounts of plasticizers and/or solvents. Alkyl carbonates, such as dibutylcarbonate, ethyleneglycol monobutylether carbonate, dihexylcarbonate or hexanediol dibutylcarbonate are suitable for that purpose. Other conventional plasticizers can be alternatively used, so long as they are compatible with the carbonate-diols.

When all of the hydroxy groups of the polymer or polyol have reacted with the isocyanate groups, the still free isocyanate groups are blocked with phenol or phenol derivatives. Preferably this operation is carried out in the presence of a catalyst, at a temperature generally not exceeding 75° C.

Without a catalyst, higher temperatures, which can be as high as about 120° C., are required. The phenol amount will be that which is required by the stoichiometry due to the unaltered isocyanate groups, or a slight excess, as compared to the stoichiometric amount.

The preferred diisocyanates in the preparation of the (A) component are isophorone-diisocyanate and hexamethylene-diisocyanate, but diphenylmethane-diisocyanate, the corresponding ring-hydrogenated derivative thereof, and toluene-diisocyanate (isomer mixture) can be used as well.

The preferred phenols used in the preparation of the (A) components are alkylphenols (e.g., nonylphenol, decylphenol and dodecylphenol), but also derivatives of cresol, nitrophenol and hydroxyalkylbenzoates can be used.

The catalysts used in the reaction of blocking the isocyanate groups are normally selected from tertiary amines and organometallic compounds, such as tin dibutyllaurate or dioctanoate, titanium tetrabutyloxy and lead or cobalt octanoate.

The (A) component of the composition of the present invention can be represented by the general formula:

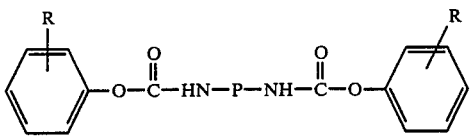

wherein P is the macromolecule of a polycarbonate-urethane and R is hydrogen or preferably an alkyl of from 1 to 20 carbon atoms.

The B Component

The (B) component of the composition of the present invention is an organic compound containing at least two —N=C< groups.

More particularly, this component, which performs the function of crosslinking agent, can be selected from:
bisketimines, definable by the formula:

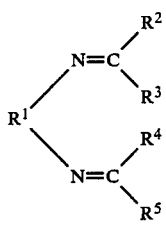

bisketiminenamines, definable by the formula:

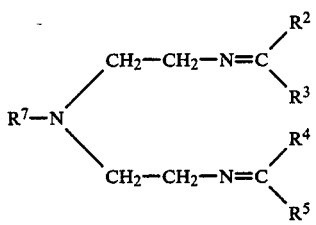

bisketiminosilazanes, definable by the formula:

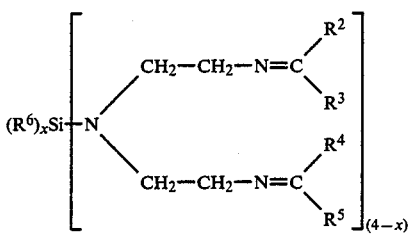

wherein:
$R^1$ represents an alkylene group of from 1 to 10 carbon atoms;
$R^2$, $R^3$, $R^4$, and $R^5$ represent, independently from one another, an alkyl group of from 1 to 10 carbon atoms, or the couples $R^2$, $R^3$ and $R^4$, $R^5$, considered jointly with the carbon atoms they are bonded to, may form 5-member or 6-member cycloaliphatic rings;
$R^6$ represents an alkyl group containing from 1 to 10 carbon atoms, a vinyl group or a phenyl group;
$R^7$ represents a cyclopentene or cyclohexene radical; x assumes the value 1 or 2.

In the preferred embodiment, $R^1$ represents an ethylidene group; $R^2$, $R^3$, and $R^4$, $R^5$ represent, jointly, cyclohexane radicals; $R^6$ represents the vinyl or methyl group; $R^7$ represents the cyclohexene radical; and x is 1 or 2.

The ketimines and the ketoiminoenamines can be prepared generally by reacting amines with carbonyl compounds. When such a carbonyl compound is a ketone, the reaction proceeds easily in the absence of catalysts, but it can be enhanced by the presence of acidic catalysts, such as p-toluenesulphonic acid and sulphonated acidic resins. Typical amine reactants are ethylenediamine, triethylenediamine, piperazine and the addition product of two piperazine molecules and one molecule of adipic acid. Among the carbonyl compounds, cyclopentanone, cyclohexanone, acetone and methylethylketone are preferred.

The reaction is favoured by removing water which forms as the reaction byproduct, e.g., by means of azeotropic distillation with an added hydrocarbon solvent, such as benzene, toluene or xylene.

The ketiminosilazanes, which constitute the preferred crosslinking agents, can be produced by starting from the polyaminic compounds, such as, e.g., diethylenetramine, blocking with ketimino groups a portion of the amino groups, by the procedure disclosed above, and then reacting them with halosilanes in the presence of hydrogen halide acid acceptors. According to an alternative route, the ketimino-amine intermediates can be reacted with alkoxysilanes, with the alcohol being removed from the reaction medium. According to a further alternative, said ketimino-amines are reacted with silicon hydrides and in this case the reaction, which released hydrogen, takes place in the presence of catalysts, such as chloroplatinic acid.

Among the halosilanes useful for that purpose are dimethylchlorosilane, methyltrichlorosilane, vinyltrichlorosilane and phenyltrichlorosilane. As the hydrogen halide acid acceptors, the tertiary amines and orthoformates may be mentioned.

Among the alkoxysilanes, dimethyldialkoxysilane, methyltrialkoxysilane, phenyltrialkoxysilane and vinyltrialkoxysilane are mentioned.

As the silicon hydride, phenylhydroxysilane can be used. In the composition of the present invention, the (B) component is present in the amount which supplies a maximum of two total ketimino and enamino groups, and preferably from 0.5 to 1.5 of such groups per each arylcarbonate group in the (A) component.

The (C) Component

The (C) component of the composition of the present invention is a tertiary amine with stressed nitrogen, and with a ketiminic carbon atom bonded to the nitrogen atom. The tertiary amine is preferably a bicyclic ketimine, having the general structure:

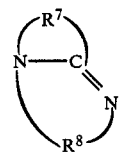

wherein $R^7$ and $R^8$ are alkylene radicals, containing from 3 to 5 carbon atoms (possibly substituted with alkyl or aryl groups) or either of $R^7$ or $R^8$ is the —$(CH_2)_3$—NH— radical.

Examples of such bicyclic ketimines are:

1,5-diazabicyclo(4.3.0)non-5-ene

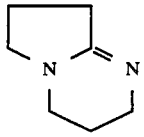

1,5-diazabicyclo(5,4.0)undec-7-ene

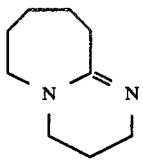

3-phenyl-1,4-diazabicyclo(4.3.0)non-5-ene

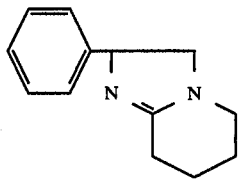

4-phenyl-1,5-diazabicyclo(4.4.0)dec-5-ene

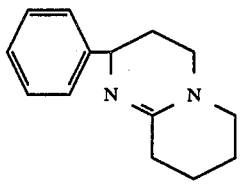

1,5,7-triazabicyclo[4.4.0]dec-5-ene

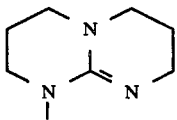

The bicyclic ketimine 1,5-diaza(5,4,0)undec-7-ene can be prepared by reacting caprolactam and acrylonitrile (Michael reaction) and catalytically reducing with hydrogen the so-obtained reaction product, as described by H. Oediger and H. Moller in Angew. Chem., 79, 53 (1967).

In a similar way, 1,5-diazabicyclo(4,3,0)-non-5-ene can be prepared by starting from butyrolactam. Other bicyclic ketimines are described in Tetrahedron Letters, 51, 5175-7 (1967).

The bicyclic ketimine, which performs the function of catalyst, is present in the composition of the present invention in amounts of at least 0.5 parts by weight, and generally of from 0.5 to 2 parts by weight per each 100 parts by weight of the (A) component.

Larger catalyst amounts are not generally necessary, but, if present, they do not endanger, within wide limits, the characteristics of the compositions and of the related crosslinking products. The preferred catalyst is 1,5-diaza(5,40)undec-7-ene.

The Composition

The elastomeric fluid composition crosslinkable in the presence of ambient humidity according to the present invention is obtained by blending the above indicated (A), (B) and (C) components, in such relative proportions as already specified.

Besides these basic components, the composition may contain one or more usual additives selected from plasticizers (for the purpose of reducing the viscosity), inorganic fillers (such as calcium carbonate, talc and silica), thixotropic agents, stabilizer agents (antioxidants and U.V.-light absorbers), catalysts, and adhesion promoters.

The composition of the present invention is capable of crosslinking, under ambient conditions of temperature and humidity, in an unexpectedly fast manner, so as to result in the composition no longer flowing after the first hour, and being a completely crosslinked solid after 48 hours.

In order to obtain such desirable results, the presence of the catalyst ((C) component) is essential, in that it was observed that compositions lacking this component were not yet crosslinked after 30 days of exposure to the ambient conditions of temperature and humidity.

The compositions of the present invention, using a polycarbonate elestomeric base polymer, are useful as sealants endowed with a high resistance to oxidation, to hydrolysis and to U.V. light, and to ageing in general. The compositions are useful in such application sectors as the construction and auto industries.

The following experimental examples are illustrative and are not to be construed as limiting the scope of the present invention.

EXAMPLE 1

(a) Preparation of polycarbonate-urethane-α,ω-(p-nonylphenyl)-carbamate

A polycarbonate-diol is prepared by copolymerization of diallylcarbonate with a mixture of diols: 1,6-hexanediol/1,10-decanediol/1,5-pentanediol in the molar ratio to each other of 4.490/1.634/1, according to the general procedure as reported in the above disclosure. The so-obtained polycarbonate-diol shows the following characteristics:

| | |
|---|---|
| number average molecular weight: | $M_n = 1,860$ |
| content of alcoholic hydroxyls: | 1.83% by weight |
| ethylenic unsaturations: | 0.03 meq/g |
| viscosity (at 25° C.): | 24.0 Pa.s |
| glass transition temperature: | −51° C. |

The so-obtained polycarbonate-diol (300 g; 0.323 —OH mol) is reacted with isophorone-diisocyanate (75.1 g; 0.675 —NCO mol) in tetrahydrofuran (45 ml) in the presence of tin dibutyldilaurate (1.5 g). The reaction is carried out at 65°-67° C., until the disappearance of the hydroxy absorption band (I.R.; 3,380 cm$^{-1}$). The required time is of 3–4 hours. To the reaction mixture p-nonylphenol (77.4 g; 0.351 mol) is then added, and the reaction is continued at the same temperature, for a further 4 hours, until the disappearance of the I.R. absorption band corresponding to the isocyanate group from the reaction mixture. Thus the polycarbonate-urethane-α,ω-(p-nonylphenyl)-carbamate is obtained, which, after the removal of tetrahydrofuran by evaporation under reduced pressure, shows a viscosity value of 360 Pa.s 40° C.

(b) Preparation of tetrakisketiminosilazane

Diethylenetriamine (103.2 g; 1.0 mol), cyclohexanone (237.5 g; 2.42 mol), sulphonated acidic resin AMBERLYST®15-N (20 g) and benzene (200 ml) are refluxed, with stirring, inside a flask equipped with a MARKUSSON head outfit. The reaction is allowed to proceed over 1.5 hours, after which time 36 g (2 mol) of water have been azeotropically distilled.

The reaction product is filtered, as a benzene solution, in an anhydrous environment (over fritted filter).

Half of the filtrate solution (corresponding to 0.5 mol of the initially charged amine) is charged, operating under a nitrogen atmosphere, to a flask equipped with stirrer, thermometer and dripping funnel, containing anhydrous triethylamine (101 g; 2.1 mol). The flask is cooled by means of an ice bath and from the dripping funnel dimethylchlorosilane (32.3 g; 0.25 mol) is gradually added during one hour, with the mass being kept stirred, and with temperature be so controlled as not to exceed +5° C.

At the end of the addition, the mass is allowed to warm to room temperature and is left standing overnight. The triethylamine hydrochloride (69 g), formed as a reaction byproduct, is filtered over a fritted glass filter, operating under a nitrogen atmosphere, is washed on the filter with anhydrous benzene (2×50 ml) and the combined filtrate and washes are submitted to evaporation under reduced pressure and at 60° C., in order to remove benzene and unreacted triethylamine.

In this way, 140 g (yield 98% of theoretical) is obtained of a moderately viscous oil of pale yellow colour, with a specific gravity of about 1 g/ml, corresponding to the tetrakisketiminosilazane of the formula:

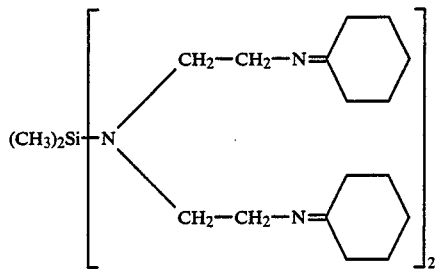

Elemental analysis for $C_{34}H_{62}N_6Si$ (molecular weight 582): Theoretical: C, 70.1%; H, 10.7%; N, 14.4%. Found: C, 71.4%; H, 10.7%; N, 13.8%.; Cl, 0.1%.

(c) Preparation of Bisketiminoenamine

The preparation is carried out according to the general conditions used in preparing the tetrakisketiminosilazane, part (b), by reacting diethylenetriamine (103.2 g; 1 mol) and cyclohexanone (356.3 g; 3.63 mol), in the presence of resin AMBERLYST®15H (20 g), in benzene (200 ml), with water (54 g; 3 mol) being azeotropically distilled over a period of 8–8.5 hours.

After the resin is filtered off, the filtrate is submitted to evaporation at 80° C. and under reduced pressure to eliminate benzene and excess cyclohexanone, yielding 372 g of an oil of yellow-orange colour, having a specific gravity of 0.992 g/ml, corresponding to the bisketiminoenamine of formula:

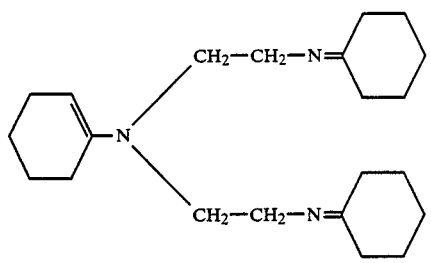

(raw formula $C_{22}H_{37}N_3$; molecular weight 343), impure due to the presence of cyclohexanone. This product can be purified by distillation (boiling point 160°–170° C. under about 0.2 torr), however it is used as such in the following examples.

(d) Preparation of the Fluid and Crosslinkable Composition 56 g of the aliphatic polycarbonate polymer prepared in the above part (a) is heated at 55° C., and the following additives are added:

U.V. ADSORB SV (stabilizer belonging to the class of benzophenones);

IRGANOX®1076 (octadecyl beta-(3,5-ditert.butyl-4-hydroxyphenyl)-propanoate);

each one in the amount of 1% by weight, based on the weight of the polymer. After cooling to 40° C., the tetrakisketiminosilazane (4.22 g; 7.0% by weight relative to the polymer), prepared as disclosed in the above part (b), as the crosslinking agent, and 1,5-diazabicyclo(5.4.0)-undec-7-ene (0.28 g; 0.5% by weight relative to the polymer), as the crosslinking catalyst, are added.

After homogenization and degassing under reduced pressure and at 40° C., the fluid composition is spread on an aluminum plate (20×20 cm), up to a 2-mm thickness, and is submitted to crosslinking by exposure to the ambient humidity, for 30 days, under ambient conditions of temperature and humidity (20°–24° C.; 70% relative humidity). This sample is designated Sample A.

In a similar way, a sample B is prepared, except that as the crosslinking agent, the bisketiminoenamine of the above part (c) (4.98 g; 8.9% by weight relative to polymer) is used.

On the hardened samples, the following characteristics are measured:

C.R.: ultimate tensile strength, as $kg/cm^2$, measured according to ASTM D-412 Standard;

Modules: elastic modulus, 100% elongation, as $kg/cm^2$, measured according to ASTM D-412 Standard;

Elongation: % elongation at break, measured according to ASTM D-412 Standard;

T.R.: Shear strength, expressed as kg/cm, measured according to ASTM D-624 Standard;

D: Shore A hardness, measured according to ASTM D-2240 Standard;

gel: expressed as % by weight, measured as the insoluble fraction in solvent (% by weight).

The results of these measurements are reported in following Table 1.

TABLE 1

|  | Sample A | Sample B |
|---|---|---|
| C.R. | 24.92 | 23.2 |
| Modulus | 3.87 | 3.82 |
| Elongation | 572 | 531 |
| T.R. | 7.0 | 8.1 |

TABLE 1-continued

|   | Sample A | Sample B |
|---|---|---|
| D. | 29 | 33 |
| Gel | 64.3 | 66.9 |

Both of Sample A and Sample B show a setting time lower than 24 hours.

In the absence of a crosslinking catalyst, the compositions of Samples A and B did not crosslink and could not be separated from the plate they had been spread on.

Replacement of the crosslinking catalyst with amounts of diazabicyclooctane (DABCO) and triethylenediamine and ranging from 0.5 to 2% by weight, relative to the weight of the polymer, did not yield useful results.

Replacement of the crosslinking catalyst with tin dibutyldilaurate and with tin dibutyloctanoate, in an amount of from 0.5 to 2% by weight relative to the polymer did not yield useful results.

Replacing the crosslinking agent with the combination of tin dibyldilaurate-dimethylbenzylamine also did not yield useful results.

EXAMPLE 2

Preparation of Polycarbonate-Urethane-α,ω-(p-Nonyl-Phenyl)-Carbamate

By means of the copolymerization of diallylcarbonate with a mixture of 1,5-pentanediol and 1,6-hexanediol (mol ratio 1:1), a polycarbonate-diol is prepared, which has the following characteristics:

| number average molecular weight: | $M_n$ 1860 |
|---|---|
| content of alcoholic hydroxyls: | 1.83% by weight |
| ethylenic unsaturations: | 0.03 meq/g |
| viscosity (at 25° C.): | 43.5 Pa.s |
| glass transition temperature | −56° C. |

This polymer (400 g) is reacted with isophoronediisocyanate (99.9 g; 0.449 mol) in tetrahydrofuran (250 ml), using tin dibutyldilaurate (2.0 g) as the catalyst, and the reaction product is then further reacted with p-nonylphenol (102 g; 0.463 mol), following the general procedures of part (a) of Example 1. The so-obtained polycarbonate-urethane-α,ω-(p-nonylphenol)-carbamate has a viscosity at 25° C., in the absence of solvent, of 930 Pa.s.

An aliquot containing 45 g of the polymer prepared as described above is used to prepare a solution in tetrahydrofuran, and then the following are added: U.V. ADSORB SV and IRGANOX ®1076 (both of them in an amount of 0.25% by weight relative to the polymer); tetrakisketiminosilazane (2.06 g; 4.5% by weight relative to the polymer), prepared as disclosed in part (b) of Example 1 (as the crosslinking agent), and 1,5-diazabicyclo(5.4.0)undec-7-ene (0.23 g; 0.5% by weight relative to the polymer) as the crosslinking catalyst.

After homogenizing and degassing under reduced pressure, the fluid composition is spread on an aluminum plate, (20×20 cm) and is under the conditions as disclosed in part (d) of Example 1. This sample is designated Sample C.

A Sample D is prepared in the same manner as Sample C, but an amount of 3.1 g (6.9% by weight relative to the polymer) of crosslinking agent is used.

The results of the measurements on hardened Samples C and D are shown in the following Table 2.

TABLE 2

|   | Sample C | Sample D |
|---|---|---|
| C.R. | 22.25 | 23.8 |
| Modulus | 2.84 | 5.29 |
| Elongation | 567 | 430 |
| T.R. | 7.36 | 8.24 |
| D. | 24 | 31 |
| Gel | 69.7 | 68.7 |

Samples prepared without the crosslinking catalyst showed no crosslinking, and therefore it was not possible to measure the characteristics of such samples.

By replacing the above-indicated crosslinking catalyst with the alternative crosslinking catalysts of Example 1, negative results were still obtained.

EXAMPLE 3

(a) Preparation of Poly(Propyleneoxide)-Urethane-α,ω-(p-Nonyl-Phenyl)-Carbamate

A poly(propyleneoxide)-diol, having a content of alcoholic hydroxyls equal to 0.17% by weight, and a number average molecular weight of 2,000 (100 g), is reacted in tetrahydrofuran with isophoronediisocyanate (23.1 g; 1.04 mol), in the presence of tin dibutyldilaurate (0.80 g) under the general conditions described above for part (a) of Example 1.

After all of the hydroxyl groups are reacted, as indicated by the disappearance of the hydroxyl absorption bands from the I.R. spectrum of the reaction mixture, p-nonylphenol (27.6 g; 1.250 mol) is added and the reaction is carried out until the disappearance the isocyanate group absorption band from the I.R. spectrum of the reaction mixture. Thus the poly(propyleneoxide)urethane-α,ω-(p-nonylphenyl)-carbamate is obtained, with a viscosity (at 25° C.) of 30.6 Pa.s. U.V. ABSORB SV and IRGANOX ®1076 are added, both in the amount of 1% by weight relative to same polymer.

(b) Preparation of Esakisketiminosilazane

Half of the solution obtained by reacting diethylenetriamine (103.2 g) and cyclohexanone (237.5 g), obtained as disclosed in part (b) of Example 1 (corresponding to 0.5 mol of the initially charged amine) is charged to a glass flask equipped with mechanical stirrer, nitrogen inlet system, thermometer, dripping funnel and reflux condenser.

Operating under a nitrogen atmosphere, the flask is charged with anhydrous triethylamine (101.2 g; 1.0 mol). After cooling to +5° C., vinyltrichlorosilane (7.1 g; 0.168 mol) is added through the dripping funnel, over a period of about one hour, with the temperature of the mass being maintained at 7°-8° C.

At the end of the addition, the temperature of the mass is increased to 35°-40° C. and the mass is stirred for a further 4 hours. After standing overnight under ambient conditions, triethylamine hydrochloride is filtered off by using a fritted glass filter, operating under a nitrogen atmosphere, and the precipitate is washed twice with benzene. The combined filtrate and washes are submitted to evaporation under reduced pressure (0.2 torr) to remove benzene and unreacted triethylamine.

In this way, 124 g (yield 89.9% of the theoretical value) is obtained of a very viscous oil of yellow colour, with a specific gravity of 1.05 g/ml, corresponding to the hexakisketiminosilazane of the formula:

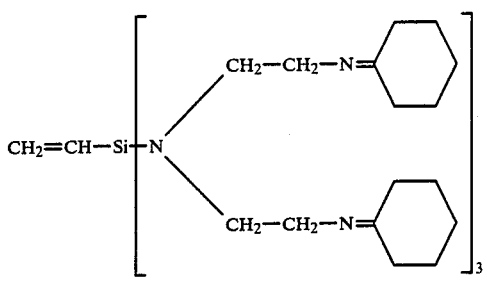

Elemental analysis for $C_{50}H_{87}N_9Si$ (molecular weight 841): Theoretical: C, 71.3%; H, 10.3%; N, 15.0%. Found: C, 72.3%; H, 10.3%; N, 14.0%.

(c) Preparation of the Fluid and Crosslinkable Composition

The solution of the polymer in tetrahydrofuran obtained in the part (a) of the present Example is subdivided into three parts, each containing about 50 g of polymer. With these aliquots, the following are prepared: (Sample E addition of 3.98 g of bisketiminoenamine of part (c) of Example 1 and 0.5 g of 1,5-diazabicyclo(5.4.0)undec-7-ene); the Sample F (addition of 3.37 g of tetrakisketiminosilazane of part (b) of Example 1 and 0.5 g of 1,5-diazabicyclo(4.3.0)non-5-ene); and G Sample (addition of 3.25 g of hexakisketiminosilazane of part (b) of the present Example and 0.5 g of 1,5-diazabicyclo(5.4.0)undec-7-ene.

These samples are spread and crosslinked as disclosed in Example 1, and on the crosslinked samples the characteristics as reported in following Table 3 are measured.

TABLE 3

|  | Sample E | Sample F | Sample G |
|---|---|---|---|
| C.R. | 7.54 | 7.76 | 11.14 |
| Modulus | 3.24 | 5.02 | 5.08 |
| Elongation | 303 | 182 | 254 |
| T.R. | 4.81 | 5.70 | 6.5 |
| D. | 14 | 26 | 26 |
| Gel | 75.6 | 81.7 | 81.5 |

Three Samples prepared as above but omitting the crosslinking agent, did not yield hardened products under the ambient conditions. The addition of the traditional crosslinking catalysts reported in Example 1 gave negative results.

EXAMPLE 4

The polycarbonate-diol of Example 2 (80 g) and diphenylmethane-diisocyanate (21.3 g; 86.6 mmol) are reacted in tetrahydrofuran (50 ml) in the presence of tin dibutyldilaurate (0.4% by weight relative to the prepolymer) under the general conditions of Example 1, part (a). After the disappearance of the hydroxy groups from the reaction mixtures I.R. spectrum, p-nonylphenol (19.1 g; 85.6 mmol) diluted in tetrahydrofuran (20 ml) is added. The reaction is continued until the disappearance of the band corresponding to the isocyanate group, as determined by I.R. spectrometry. A polycarbonate-urethane-$\alpha,\omega$-(p-nonylphenol)-carbamate polymer having a viscosity at 40° C. of 308 Pa.s was obtained.

To this polymer, U.V. ABSORB VS (0.5% by weight) and IRGANOX ®1076 (0.3% by weight) are added and the polymer is then subdivided into two equal portions, each containing about 55 g of the polymer. With these portions, the Sample H (addition of 4.75 g of bisketiminoenamine of part (c) of Example 1 and 0.41 g of 1,5-diazabicyclo(4.3.0)non-5-ene) and the Sample I (addition of 4.75 g of bisketimine of part (c) of Example 1 and 0.8 g of 1,5-diazabicyclo(5.4.0)undec-7-ene) were prepared. These samples are spread and crosslinked as disclosed in Example 1, and on the crosslinked samples the characteristics as reported in following Table 4 are measured.

TABLE 4

|  | Sample H | Sample I |
|---|---|---|
| C.R. | 46.08 | 61.45 |
| Modulus | 14.79 | 13.37 |
| Elongation | 275 | 358 |
| T.R. | nd | nd |
| D. | nd | nd |
| Gel | nd | nd | nd = not measured.

EXAMPLE 5

(Ageing Test)

Polycarbonate terminated by arylcarbamic groups is prepared according to Example 2 (Sample D), except no antioxidant is added.

After cross-linking under the conditions already set forth in previous examples, the product had the following characteristic:

| C.R. | 23 |
|---|---|
| Modulus | 7 |
| Elongation | 500 |

Such a product was placed in a U.V.-CON Weatherometer and, after 28 days of accelerated ageing, the following characteristics were found on the aged product:

| C.R. | 22 |
|---|---|
| Modulus | 6 |
| Elongation | 550 |

Under the same conditions, a composition which contained an elastomeric polymer composed of a polyether and polyester elastomeric base were completely degraded.

We claim:

1. A fluid composition crosslinkable under ambient conditions of temperature and humidity to provide solid elastomeric products, comprising:
  (A) an elastomeric aliphatic polycarbonate, having functional phenylcarbamate or (substituted phenyl)-carbamate end groups, and having a number average molecular weight of from 500 to 3,000;
  (B) an organic compound having at least two —N=C< groups selected from bisketimines, bisketiminoenamines or bisketiminosilazanes;
  (C) a tertiary amine of the formula

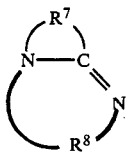

wherein $R^7$ and $R^8$ are alkylene radicals, containing from 3 to 5 carbon atoms, possibly substituted with alkyl or aryl groups, or either $R^7$ or $R^8$ is the —$(CH_2)_3$—NH-radical; wherein the (B) component is present in the amount which supplies a maximum of 2 total ketimino or enamino groups per arylcarbamate group in the (A) component, and the (C) component is present in an amount of at least 0.5 parts by weight per each 100 parts by weight of the (A) Component.

2. A composition according to claim 1, wherein the (A) component is the product obtained from the reaction of a diol or polyol of polycarbonate, with an aliphatic diisocyanate, to yield the corresponding polymer with isocyanate end groups, followed by the reaction with phenol or substituted phenol to block said isocyanate end groups.

3. A composition according to claim 2, wherein said diol or polyol is an aliphatic polycarbonate diol or polyol.

4. A composition according to claim 1, wherein said (B) component is selected from:

bisketimines, definable by the formula:

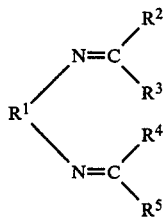

bisketiminoenamines, definable by the formula:

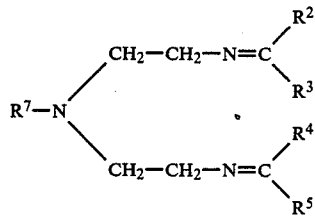

bisketiminosilazanes, definable by the formula:

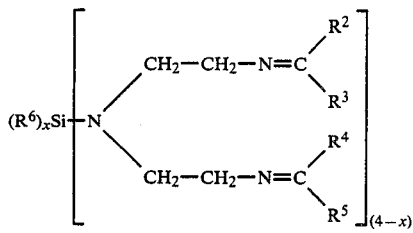

wherein:

$R^1$ represents an alkylene group of from 1 to 10 carbon atoms;

$R^2$, $R^3 R^4$, and $R^5$ represent, independently from one another, an alkyl group of from 1 to 10 carbon atoms, or the couples $R^2$, $R^3$ and $R^4$, $R^5$, considered jointly with the carbon atoms they are bonded to, form 5-member or 6-member cycloaliphatic rings;

$R^6$ represents an alkyl group containing from 1 to 10 carbon atoms, vinyl group or phenyl group;

$R^7$ represents a cyclopentene or cyclohexene radical;

x has the value 1 or 2.

5. A composition according to claim 4 wherein, in said formulae:

$R^1$ represents an ethylidene group;

$R^2$ and $R^3$, and also $R^4$ and $R^5$ represent, with the carbon atoms they are respectively bonded to, cyclohexane moieties;

$R^6$ represents a vinyl or methyl group;

$R^7$ represent a cyclohexene radical; and x is 1 or 2.

6. A composition according to claim 1, wherein said (C) component is selected from 1,5-diazabicyclo(4.3.0)-non-5-ene; 1,5-diazabicyclo(5,40)undec-7-ene; 3-phenyl-1,4-diazabicyclo(4.3.0)non-3-ene; 4-phenyl-1,5-diazabicyclo(4.4.0)undec-5-ene; 1,5,7-triazabicyclo[4.4.0]dec-5-ene.

7. A composition according to claim 1, wherein the (B) component is present in the amount which supplies from 0.5 to 1.5 total ketimino and enamino groups for each arylcarbamate group of the (A) component and the (C) component is present in an amount of from 0.5 to 2 parts by weight per each 100 parts by weight of the (A) component.

8. A composition according to claim 1, which contains one or more additives selected from plasticizers, inorganic fillers, thixotropic agents, stabilizing agents, other catalysts, and adhesion promoters.

9. A sealant compound including the composition of claim 1.

* * * * *